US012701540B2

(12) United States Patent
Yuan et al.

(10) Patent No.:    US 12,701,540 B2
(45) Date of Patent:         Aug. 4, 2026

(54) CONCURRENT MEASUREMENT GAP CONFIGURATION

(71) Applicant: Nokia Technologies Oy, Espoo (FI)

(72) Inventors: Ping Yuan, Beijing (CN); Jing He, Beijing (CN); Lei Du, Beijing (CN); Lars Dalsgaard, Oulu (FI); Jürgen Hofmann, Merching (DE); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 284 days.

(21) Appl. No.: 18/705,484

(22) PCT Filed: Oct. 28, 2021

(86) PCT No.: PCT/CN2021/127165
§ 371 (c)(1),
(2) Date: Apr. 26, 2024

(87) PCT Pub. No.: WO2023/070463
PCT Pub. Date: May 4, 2023

(65) Prior Publication Data
US 2025/0240762 A1      Jul. 24, 2025

(51) Int. Cl.
*H04W 64/00*          (2009.01)
*H04W 36/00*          (2009.01)
(52) U.S. Cl.
CPC ..... *H04W 64/003* (2013.01); *H04W 36/0088* (2013.01)
(58) Field of Classification Search
CPC . H04W 24/10; H04W 36/0088; H04W 24/08; H04W 76/28; H04W 8/24;
(Continued)

(56) References Cited

U.S. PATENT DOCUMENTS

| 11,558,790 B2* | 1/2023 | Cui | H04W 24/10 |
| 12,256,246 B2* | 3/2025 | Zhang | H04W 36/0094 |

(Continued)

FOREIGN PATENT DOCUMENTS

| CN | 109788496 A | 5/2019 |
| CN | 111247852 A | 6/2020 |

(Continued)

OTHER PUBLICATIONS

"New WI Proposal: NR measurement gap enhancements", 3GPP TSG RAN Meeting #89e, RP-202119, Agenda Item: 9.1.2, Intel Corporation, Sep. 14-18, 2020, 5 pages.
(Continued)

*Primary Examiner* — Joseph Arevalo
(74) *Attorney, Agent, or Firm* — Barta Jones, PLLC

(57)             ABSTRACT
Embodiments of the present disclosure relate to devices, methods, apparatuses and computer readable storage media of enabling flexible concurrent MG configuration. The method comprises obtaining, from a second device, configuration information at least comprising a set of default measurement gap configurations associated with at least one of the following: a reference signal type related to at least one measurement object, or a positioning reference signal measurement; receiving, from the second device, an indication whether at least one default measurement gap configuration in the set of default measurement gap configurations is allowed to be used for at least one of a target positioning reference signal measurement and one or more target measurement objects; and performing, based on the indication, at least one target measurement associated with at least one of the target positioning reference signal measurement and the one or more target measurement objects. In this way, the concurrent MGs can be supported in a signalling efficient way.

20 Claims, 5 Drawing Sheets

(58) Field of Classification Search
    CPC . H04W 48/16; H04W 64/00; H04W 72/0453;
            H04W 72/0457; H04W 88/06; H04W
            64/003; H04W 24/02; H04W 28/18;
            H04W 36/00698; H04W 36/0058; H04W
            36/0069; H04W 36/0085; H04W 36/0094;
            H04W 48/12; H04W 56/001; H04W
            56/0015; H04W 72/542; H04W 74/0833;
            H04W 84/06; H04W 36/00; H04W 56/00;
            H04W 72/00; H04W 72/23; H04W 8/22
    USPC ...... 455/456.2, 456.1, 558, 423, 436, 553.1,
                        455/67.11, 435.2, 552.1
    See application file for complete search history.

(56) References Cited

U.S. PATENT DOCUMENTS

| | | | | |
|---|---|---|---|---|
| 2019/0150015 A1* | 5/2019 | Wei | ..................... | H04L 27/2666 |
| | | | | 370/328 |
| 2019/0342801 A1* | 11/2019 | Cui | ...................... | H04W 72/23 |

FOREIGN PATENT DOCUMENTS

| | | | | | |
|---|---|---|---|---|---|
| CN | 112106399 A | 12/2020 | | | |
| CN | 112399401 A | 2/2021 | | | |
| EP | 3709699 A1 | 9/2020 | | | |
| WO | WO-2018063075 A1 * | 4/2018 | ........... | H04L 5/0096 |
| WO | 2020/060952 A1 | 3/2020 | | | |

OTHER PUBLICATIONS

"Revised WID on NR and MR-DC measurement gap enhance-ments", 3GPP TSG RAN Meeting #90e, RP-202658, Agenda Item: 9.8.23, Intel Corporation, Dec. 7-11, 2020, 5 pages.
"LS on R17 NR MG enhancements—Concurrent MG", 3GPP TSG RAN WG4 Meeting #100-e, R4-2115343, RAN WG4, Aug. 16-27, 2021, 2 pages.

"WF on R17 NR MG enhancements—Multiple concurrent and independent MG patterns", 3GPP TSG-RAN WG4 Meeting #100-e, R4-2115342, Agenda Item: 9.11.2.2, MediaTek Inc., Aug. 16-27, 2021, 6 pages.
3rd Generation Partnership Project; Technical Specification Group Radio Access Network; NR; Requirements for support of radio resource management (Release 17), 3GPP TS 38.133, V17.3.0, Sep. 2021, 3207 pages.
"3rd Generation Partnership Project; Technical Specification Group Radio Access Network; NR; Radio Resource Control (RRC) pro-tocol specification (Release 16)", 3GPP TS 38.331, V16.6.0, Sep. 2021, pp. 1-961.
International Search Report and Written Opinion received for corresponding Patent Cooperation Treaty Application No. PCT/CN2021/127165, dated Jul. 29, 2022, 9 pages.
"Consideration on NR and MR-DC MG enhancements", R2-2109694, 3GPP TSG-RAN WG2 Meeting #116-e, Agenda Item: 8.22, CATT, Nov. 1-12, 2021, 6 pages.
"LS on R17 NR MG enhancements—Pre-configured MG", 3GPP TSG RAN WG2#116-e, R2-2109367, RAN4, Nov. 1-12, 2021, 2 pages.
Office action received for corresponding Chinese Patent Application No. 202180049044.1, dated Sep. 26, 2025, 10 pages of office action and 5 pages of translation available.
"FL summary #3 of 8.5.4 latency improvements for DL and DL+UL methods", 3GPP TSG RAN WG1 #105-e, R1-2105991, Agenda Item: 8.5.4, Huawei, May 10-27, 2021, 62 pages.
Office action received for corresponding Chinese Patent Application No. 202180049044.1, dated Feb. 25, 2026, 9 pages of office action and 8 pages of translation/summary available.
"Discussion on multiple concurrent and independent gap patterns", 3GPP TSG-RAN WG4 Meeting #100-e, R4-2113637, Agenda Item: 9.11.2.2, Ericsson, Aug. 16-27, 2021, 10 pages.
"RAN2 impact from Rel-17 measurement gap enhancement", 3GPP TSG-RAN WG2 Meeting #116-e, R2-2110077, Agenda Item: 8.24.1, Apple, Nov. 1-12, 2021, 12 pages.

* cited by examiner

100

120

102

110

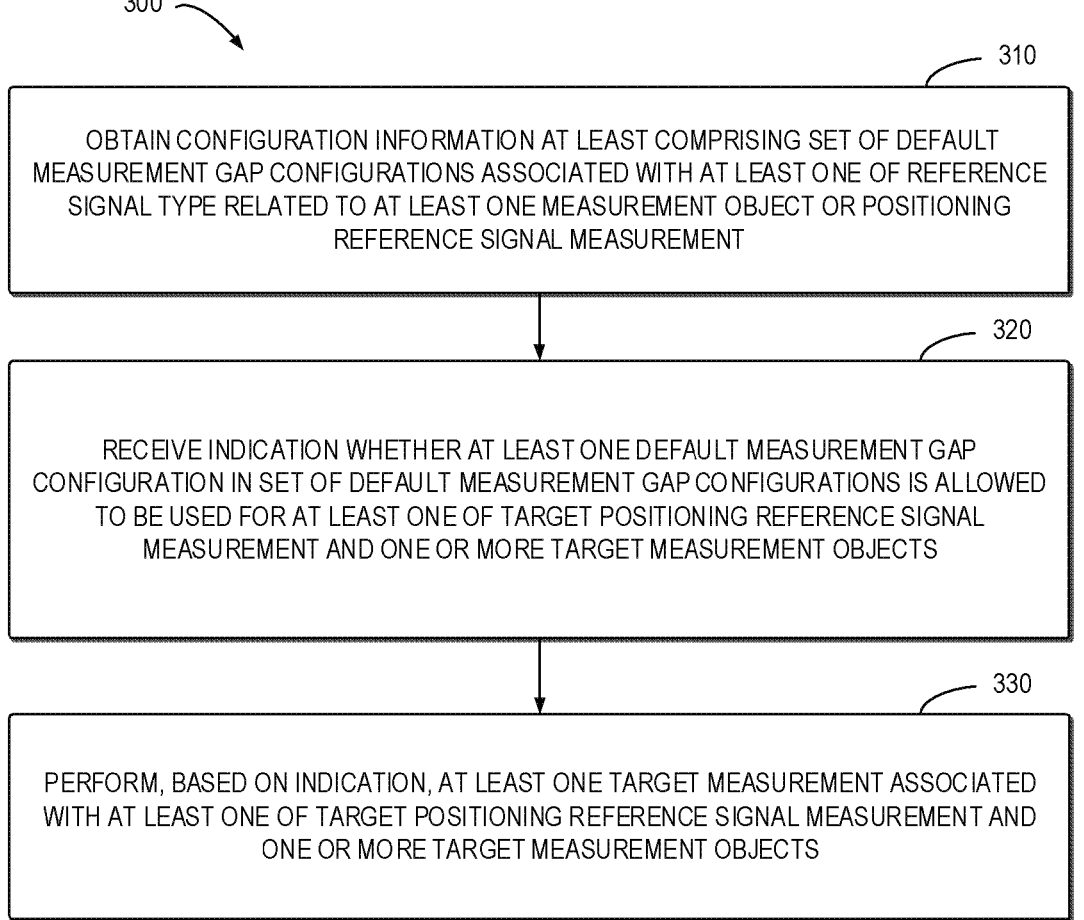

300

310

OBTAIN CONFIGURATION INFORMATION AT LEAST COMPRISING SET OF DEFAULT MEASUREMENT GAP CONFIGURATIONS ASSOCIATED WITH AT LEAST ONE OF REFERENCE SIGNAL TYPE RELATED TO AT LEAST ONE MEASUREMENT OBJECT OR POSITIONING REFERENCE SIGNAL MEASUREMENT

320

RECEIVE INDICATION WHETHER AT LEAST ONE DEFAULT MEASUREMENT GAP CONFIGURATION IN SET OF DEFAULT MEASUREMENT GAP CONFIGURATIONS IS ALLOWED TO BE USED FOR AT LEAST ONE OF TARGET POSITIONING REFERENCE SIGNAL MEASUREMENT AND ONE OR MORE TARGET MEASUREMENT OBJECTS

330

PERFORM, BASED ON INDICATION, AT LEAST ONE TARGET MEASUREMENT ASSOCIATED WITH AT LEAST ONE OF TARGET POSITIONING REFERENCE SIGNAL MEASUREMENT AND ONE OR MORE TARGET MEASUREMENT OBJECTS

FIG. 3

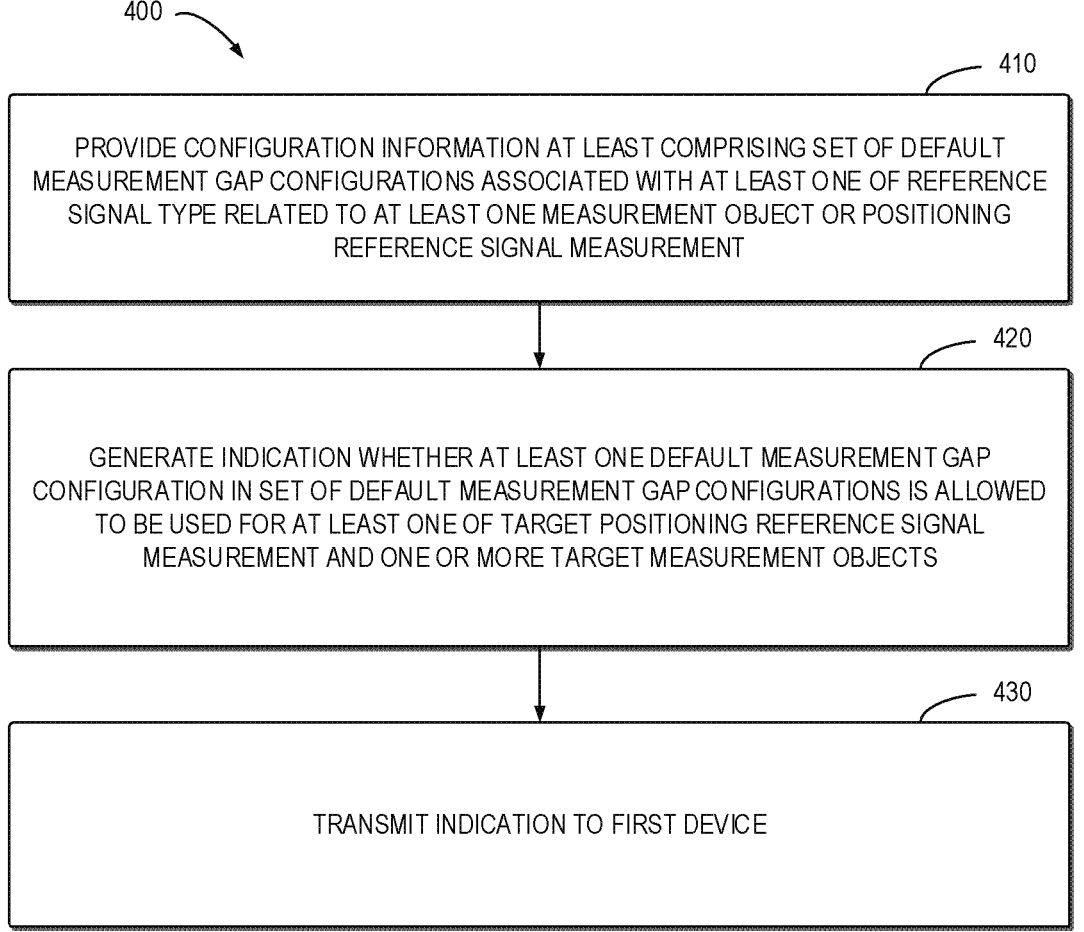

400

410

PROVIDE CONFIGURATION INFORMATION AT LEAST COMPRISING SET OF DEFAULT MEASUREMENT GAP CONFIGURATIONS ASSOCIATED WITH AT LEAST ONE OF REFERENCE SIGNAL TYPE RELATED TO AT LEAST ONE MEASUREMENT OBJECT OR POSITIONING REFERENCE SIGNAL MEASUREMENT

420

GENERATE INDICATION WHETHER AT LEAST ONE DEFAULT MEASUREMENT GAP CONFIGURATION IN SET OF DEFAULT MEASUREMENT GAP CONFIGURATIONS IS ALLOWED TO BE USED FOR AT LEAST ONE OF TARGET POSITIONING REFERENCE SIGNAL MEASUREMENT AND ONE OR MORE TARGET MEASUREMENT OBJECTS

430

TRANSMIT INDICATION TO FIRST DEVICE

CONCURRENT MEASUREMENT GAP CONFIGURATION

FIELD

Embodiments of the present disclosure generally relate to the field of telecommunication and in particular to devices, methods, apparatuses and computer readable storage media of enabling flexible concurrent Measurement Gap (MG) configuration.

BACKGROUND

The MG enhancements have been discussed in Release 17. The key point of the enhancement may fucus on the pre-configured MG per active Bandwidth Part (BWP), multiple concurrent and independent MG patterns and Network Controlled Small Gaps (NCSG).

For multiple concurrent MG patterns, it is to be expected that the procedures and signalling for simultaneous Radio Resource Control (RRC) configuration of one or more gap patterns can be designed.

SUMMARY

In general, example embodiments of the present disclosure provide a solution of enabling flexible concurrent MG configuration.

In a first aspect, there is provided a method. The method comprises obtaining, from a second device, configuration information at least comprising a set of default measurement gap configurations associated with at least one of the following: a reference signal type related to at least one measurement object, or a positioning reference signal measurement; receiving, from the second device, an indication whether at least one default measurement gap configuration in the set of default measurement gap configurations is allowed to be used for at least one of a target positioning reference signal measurement and one or more target measurement objects; and performing, based on the indication, at least one target measurement associated with at least one of the target positioning reference signal measurement and the one or more target measurement objects.

In a second aspect, there is provided a method. The method comprises providing, to a first device, configuration information at least comprising a set of default measurement gap configurations associated with at least one of the following: a reference signal type related to at least one measurement object, or a positioning reference signal measurement; generating an indication whether at least one default measurement gap configuration in the set of default measurement gap configurations is allowed to be used for at least one of a target positioning reference signal measurement and one or more target measurement objects; and transmitting the indication to the first device.

In a third aspect, there is provided a first device. The first device comprises at least one processor; and at least one memory including computer program codes; the at least one memory and the computer program codes are configured to, with the at least one processor, cause the first device at least to carry out the method according to the first aspect.

In a fourth aspect, there is provided a second device. The second device comprises at least one processor; and at least one memory including computer program codes; the at least one memory and the computer program codes are configured to, with the at least one processor, cause the second device at least to carry out the method according to the second aspect.

In a s fifth aspect, there is provided an apparatus comprising means for obtaining, from a second device, configuration information at least comprising a set of default measurement gap configurations associated with at least one of the following: a reference signal type related to at least one measurement object, or a positioning reference signal measurement; means for receiving, from the second device, an indication whether at least one default measurement gap configuration in the set of default measurement gap configurations is allowed to be used for at least one of a target positioning reference signal measurement and one or more target measurement objects; and means for performing, based on the indication, at least one target measurement associated with at least one of the target positioning reference signal measurement and the one or more target measurement objects.

In an sixth aspect, there is provided an apparatus comprising means for providing, to a first device, configuration information at least comprising a set of default measurement gap configurations associated with at least one of the following: a reference signal type related to at least one measurement object, or a positioning reference signal measurement; means for generating an indication whether at least one default measurement gap configuration in the set of default measurement gap configurations is allowed to be used for at least one of a target positioning reference signal measurement and one or more target measurement objects; and means for transmitting the indication to the first device.

In a seventh aspect, there is provided a computer readable medium having a computer program stored thereon which, when executed by at least one processor of a device, causes the device to carry out the method according to the first aspect or the second aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where

FIG. 3 shows a flowchart of an example method of enabling flexible concurrent MG configuration according to some example embodiments of the present disclosure;

FIG. 4 shows a flowchart of an example method of enabling flexible concurrent MG configuration according to some example embodiments of the present disclosure;

Throughout the drawings, the same or similar reference numerals represent the same or similar element.

DETAILED DESCRIPTION

Figure 1:
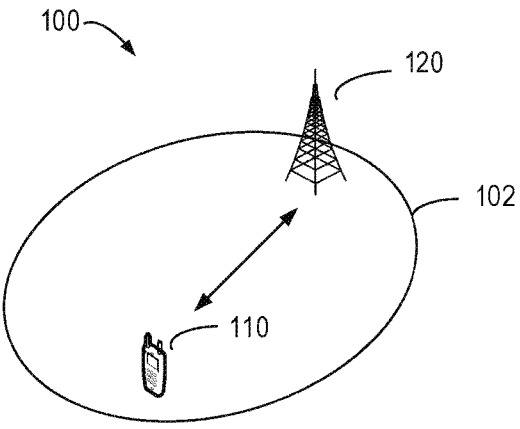
FIG. 1 illustrates an example environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. A RAN split architecture comprises a gNB-CU (Centralized unit, hosting RRC, SDAP and PDCP) controlling a plurality of gNB-DUs (Distributed unit, hosting RLC, MAC and PHY). A relay node may correspond to DU part of the IAB node.

The term "terminal device" refers to any end device that may be capable of wireless communication. By way of example rather than limitation, a terminal device may also be referred to as a communication device, user equipment (UE), a subscriber station (SS), a portable subscriber station, a mobile station (MS), or an access terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

FIG. 1 shows an example communication network 100 in which embodiments of the present disclosure can be implemented. As shown in FIG. 1, the communication network 100 may comprise a terminal device 110 (hereinafter may also be referred to as a UE 110 or a first device 110). The communication network 100 may further comprise a network device 120 (hereinafter may also be referred to as a gNB 120 or a second device 120). The network device 120-1 can manage a cell 102 and communicate with the terminal device 110 in the coverage of the cell 102.

It is to be understood that the number of network devices and terminal devices shown in FIG. 1 is given for the purpose of illustration without suggesting any limitations. The communication network 100 may include any suitable number of network devices and terminal devices.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

As described above, the RRC inactive state has been introduced for 5G service. A UE may be configured from connected state into inactive state by its last serving cell which may send to the UE an RRC suspend message including the applicable RAN notification area (RNA). The last serving cell becomes the anchor cell for the UE keeping the UE context when the UE is in inactive state.

The legacy MG configuration is signaled by single IE MeasGapConfig via RRC, which is generic and applies to all configured Measurement Objects (MOs), which may also be referred to as frequency layers. The network can control setup/release of per-UE or per-Frequency Range (FR) measurement gap configuration, where the MG configuration includes the measurement gap length (mgl), measurement gap repetition period (mgrp), measurement gap timing advance (mgta) and gapOffset etc.

There are two support levels for MG patterns, namely per-UE gap, with which the UE may support a common set of MG patterns in FR1 and FR2 and the MG patterns belonging to this support level may include 0 . . . 11, 24 and 25; and per-FR gap, with which the UE may support different MG patterns in FR1 or FR2, as absolute RF switching time are different (with 0.5 ms in FR1/0.25 ms in FR2) and the MG patterns belonging this support level may include (FR1: 0 . . . 11; FR2: 12 . . . . 23).

As described above, the MG enhancements on multiple concurrent MG patterns is expected to be developed. It has been agreed that there will be a frequency layer to be measured associated to the concurrent Measurement Gap Pattern (MGP), which is different from current (legacy) MGP which is generic and applies to all configured measurement objects (frequency layers).

However, the RRC signalling and MG activation/deactivation procedure to support multiple concurrent MG patterns are not addressed yet, a new mechanism is expected to be designed to support concurrent MGs in a signalling efficient way.

The present disclosure proposes a solution of enabling flexible concurrent MG configuration. In this solution, the UE may obtain configuration information at least comprising a set of default measurement gap configurations associated with at least one of a reference signal type related to at least one measurement object or a positioning reference signal measurement. The UE may receive an indication whether at least one default measurement gap configuration in the set of default measurement gap configurations is allowed to be used for at least one of a target positioning reference signal measurement and one or more target measurement objects and perform, based on the indication, at least one target measurement associated with at least one of the target positioning reference signal measurement and the one or more target measurement objects.

Principle and implementations of the present disclosure will be described in detail below with reference to FIG. 2, which shows a signaling chart illustrating a process 200 of enabling flexible concurrent MG configuration according to some example embodiments of the present disclosure. For the purpose of discussion, the process 200 will be described with reference to FIG. 1. The process 200 may involve the UE 110 and the gNB 120 as illustrated in FIG. 1.

To support the multiple concurrent MG patterns, the gNB 120 may configure multiple MG configurations. The multiple MG configurations can be configured for one or more MOs, i.e., frequency layers and/or a Positioning Reference Signal (PRS) measurement.

In some example embodiments, the gNB 120 may configure a common MG configuration list comprising a set of different MOs may consider the configured measurement weight to decide measurement time sharing.

In some example embodiments, the common MG configuration list configured by the gNB 120 may be represented as below:

TABLE 1

| an example of the common MG configuration list |
|---|
| Per-UE MG Configurations: |
|     Index1: MG-Pattern-1 (gap offset, mgl, mgrp, mgta), Measurement Weight |
|     Index2: MG-Pattern-2 (gap offset, mgl, mgrp, mgta), Measurement Weight |
|     ... |
|     Index M: MG-Pattern-M (gap offset, mgl, mgrp, mgta), Measurement Weight |
| Per-FR1 MG Configurations: |
|     Index M+1: MG-Pattern-M+1 (gap offset, mgl, mgrp, mgta), Measurement Weight |
|     Index M+2: MG-Pattern-M+2 (gap offset, mgl, mgrp, mgta), Measurement Weight |
|     ... |
|     Index N: MG-Pattern-N (gap offset, mgl, mgrp, mgta), Measurement Weight |
| Per-FR2 MG Configurations: |
|     Index N+1: MG-Pattern-N+1 (gap offset, mgl, mgrp, mgta), Measurement Weight |
|     Index N+2: MG-Pattern-N+2 (gap offset, mgl, mgrp, mgta), Measurement Weight |
|     ... |
|     Index L: MG-Pattern-L (gap offset, mgl, mgrp, mgta), Measurement Weight |

MG configurations, which can be potentially used by different (one or more) target frequency layers to be measured when concurrent MG is to be used.

In some example embodiments, the set of MG configurations in the common MG configuration list may comprise a first set MG configurations configured for per-UE gap configurations, i.e., for all frequency ranges of the UE. The set of MG configurations in the common MG configuration list may also comprise a second set MG configurations configured for per-FR gap configurations, i.e., for a specific frequency range, such as FR1 and/or FR2.

For example, the per-UE gap may include one or multiple gap patterns id #0 . . . 11, 24 and 25. The per-FR1 gap may include one or multiple gap patterns id #0 . . . 11, the per-FR2 gap includes gap pattern id #12 . . . 23. The Gap patterns in the table can be configured for a full range of gap patterns, or the maximum allowed number of MG patterns which are used for concurrent MG, for example, 3-4 MG patterns.

Each MG configuration in the first and the second MG configurations may be assigned by an index, which may be associated to a MO or a PRS measurement. The indices of the MG configuration in the common MG configuration list may be assigned implicitly by the order of MGs in the list or explicitly assigned an index for each MG in RRC configuration.

Each MG configuration in the common MG configuration list may include multiple configuration parameters such as the measurement gap length (mgl), the measurement gap repetition period (mgrp), the measurement gap timing advance (mgta) and the gapOffset etc. Alternatively, the configuration parameters may also include the pre-defined gap pattern ID, the gapOffset and the gapType, i.e., per UE, FR1, FR2 or per carrier.

Alternatively, one or more MG configurations in the common MG configuration list can be the pre-configured MG configuration, in which the RRC parameters are similar as legacy MeasGapConfig but with an additional indicator for pre-MG type.

In some example embodiments, each MG configuration in the common MG configuration list may also be configured with a measurement weight. Thus, in case of collision of any two or three MG patterns in time, the measurement on the It is to be understood that the common MG configuration list can also be configured with another format different from the example shown as above.

In some example embodiments, the gNB 120 may also configure a set of default measurement gap configurations, which may be associated with a reference signal type related to at least one MO and/or a PRS measurement.

Similarly, each default measurement gap configuration may also be assigned by an index, which may be associated to a MO or a PRS measurement.

For example, the default measurement gap configurations configured for a reference signal type related to at least one MO and/or a PRS measurement may be listed as Default_MG_SSB=index #A, Default_MG_CSI-RS=index #B, Default_MG_Inter-RAT_LTE=index #C and Default_MG_PRS=index #D.

In some example embodiments, each default measurement gap configuration may also be configured with a measurement weight.

In some example embodiments, the configured default measurement gap configurations may be considered as a subset of the common MG configuration list.

In some example embodiments, the set of default measurement gap configurations configured by the gNB 120 may be represented as below:

TABLE 2

| an example of default measurement gap configurations |
|---|
| Default MG Configurations with Index from the common list: |
|     Default_MG_SSB = index#1, Measurement Weight |
|     Default_MG_CSI-RS = index#2, Measurement Weight |
|     Default_MG_Inter-RAT_LTE = index#3, Measurement Weight |
|     Default_MG_PRS = index#4, Measurement Weight |

It is to be understood that the default measurement gap configurations can also be configured with another format different from the example shown as above.

Figure 2:
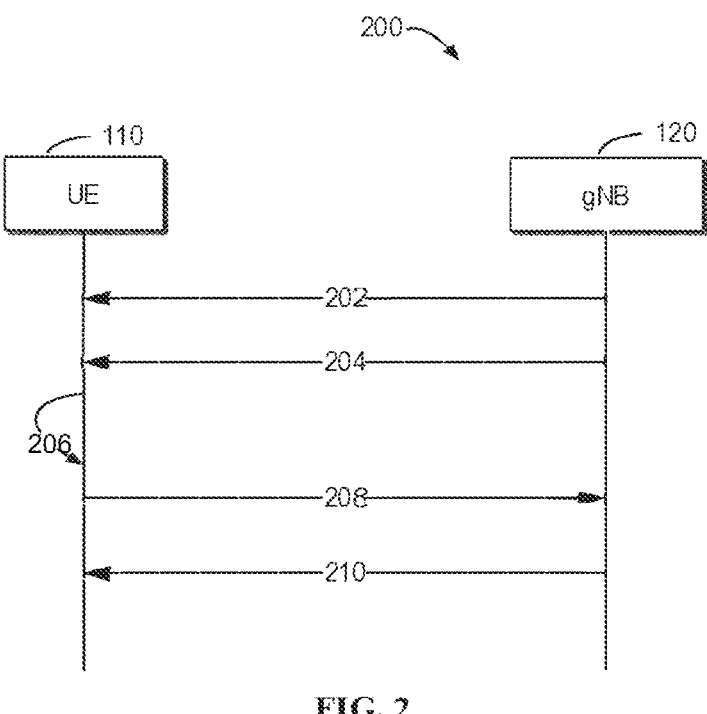
FIG. 2 shows a signaling chart illustrating a process of enabling flexible concurrent MG configuration according to some example embodiments of the present disclosure.

Now the reference is made to FIG. 2, the gNB 120 may transmit 202 configuration information associated with configured multiple MG configurations to the UE 110. The configuration information may at least comprise the configured default measurement gap configurations. For example, the configuration information may comprise the common MG configuration list, in which the configured default measurement gap configurations may be considered as a subset of the common MG configuration list.

In some example embodiments, the configuration information may be transmitted from the gNB 120 to the UE 110 via a RRC signalling.

It is to be understood that all configured MG configurations include in the configuration information may not be activated when the gNB 120 transmits the configuration information to the UE 110. The UE 110 may activate the corresponding MG configurations by an additional indication transmitted from the gNB 120.

The gNB 120 may also transmit 204 an indication to the UE 110, which at least indicating whether at least one default measurement gap configuration in the set of default measurement gap configurations is allowed to be used for at least one of a target PRS measurement and one or more target MOs.

In some example embodiments, for a target frequency layer to be measured, the indication may comprise a 1-bit flag to indicate whether a default measurement gap configuration is allowed to be used, which may be included in MO or PRS measurement configurations with SetupRelease type.

For example, "flag=true" means the default MG configuration should be used, while "flag=false" means the default MG configuration can NOT be used. The absence of the new IE for the association means gapless measurement is supported for the target frequency layer.

Furthermore, the indication may indicate whether at least one default measurement gap configuration in the set of default measurement gap configurations is allowed to be used by introducing the weight information to the indication. For example, if a default measurement gap configuration with a higher weight value or weight indicators is included in the indication, the default measurement gap configuration is allowed to be used.

For each target frequency layer to be measured, the UE 110 and the gNB 120 may exactly know the reference signal type, thus know which default MG configuration should be used for each frequency layer.

For example, if the gNB 120 determines that a default MG configuration for a MO associated with a Channel State Information (CSI-RS) can be used, the indication may be represented as below:

TABLE 3 an example of the indication

Measurement Object#4 for CSI-RS
    SetupRelease
    {default_MG_flag=true}
    Note: MG_Index#2 will be used.

It is to be understood that the indication can also be represented with another format different from the example shown as above.

In some example embodiments, if the gNB 120 determines that the default MG configuration for a MO cannot be used, i.e., flag=false, then additional index may be indicated in the indication for this MO to point to a different MG in the common MG configuration list.

In this situation, for example, for a target MO to be measured, the gNB 120 may associate the target MO to a MG configuration in the common MG configuration list by pointing the MO to an index in the common MG configuration list, when the gNB 120 decides to configure the MO and/or PRS measurement.

In some example embodiments, the index may cover all the entries configured in the list (e.g., 2 bits index if the total number of entries is 4, or 6 bits index if the total number of entries is 38).

For each MO with a reference signal type (e.g., System Sync Block (SSB) or CSI-RS or LTE CRS for inter-RAT measurement), the gNB 120 may associate the MO to one MG configuration in the common MG configuration list. For the MO with two reference signal types (e.g., SSB and CSI-RS), the gNB 120 may associate the MG configuration to each of the reference signal type. That is, two reference signal types in the MO should be indexed to MG configuration separately.

In some example embodiments, the gNB 120 may transmit the indication to the UE 110 via a RRC signalling or lower layer signalling such as Downlink Control Information (DCI) or Medium Access Control/Control Element (MAC/CE).

In some example embodiments, the gNB 120 may transmit the indication along with the transmission of the configuration information. That is, the action 202 and 204 shown as in FIG. 2 can also be considered as a same action.

To facilitate setup/release MG for each MO or each reference signal type via RRC, the optional parameterised RRC element type SetupRelease should be used for the association between MO and MG in the common MG configuration list, where MG can be released or setup via choice. Furthermore, the absence of the new IE for the association means gapless measurement is supported for the target frequency layer/MO.

Similarly, for a PRS measurement, a new RRC message (or IE(s) with SetupRelease type) should be defined to inform UE the MG index in the common MG configuration list which is associated to the PRS measurement. The MG indexed to PRS measurement will be activated after the RRC message to configure the association.

Now referring back to FIG. 2, the UE 110 may perform 206 at least one target measurement associated with at least one of the target PRS measurement and the one or more target Mos based on the indication and the configuration information.

In some example embodiments, if the UE 110 determines, based on the indication, that a default MG configuration associated with a target MO is allowed to be used, the UE 110 may determine the index associated with the target MO and obtain the corresponding default MG configuration from the configuration information. Then the UE may perform the measurement corresponding to the target MO based on the default MG configuration.

In some example embodiments, if the UE 110 determines, based on the indication, that no default MG configuration associated with a target MO is allowed to be used, the UE 110 may determine the index associated with the target MO from the indication. The UE 110 may obtain the corresponding MG configuration from the common MG configuration list. Then the UE may perform the measurement corresponding to the target MO based on the corresponding MG configuration.

In some example embodiments, if the indication indicates multiple target MOs, the UE 110 may perform the corresponding measurements based on the respective weights configured to corresponding MG configurations associated with the multiple target MOs.

For example, if two concurrent MG patterns (associated to two MOs, say MGP1 for MO1, MGP2 for MO2) overlapped in time, in the overlapped duration, each MO (i.e. each of the frequency layer to be measured) will share the overlapped the duration based on its weight. For example, if MGP1_Weight=20%, MGP2_Weight=30%, then MO1_time_sharing=20/(20+30)=40% and MO2_time_sharing=30/(20+30)=60%.

In this solution, in some example embodiments, the MG indexed to MO may be activated after the RRC configuration to configure the MO. If the MG indexed to the MO is non-pre-configured MG, it will be activated immediately after the RRC configuration. If the MG indexed to the MO is pre-configured MG, the MG activation/deactivation is decided by the MG requirement when UE is served by each of the 4 BWPs in the cell.

After performing the corresponding measurement, the UE 110 may report 208 the measurement result to the gNB 120.

In some example embodiments, if the gNB 120 determines that one or more MOs or the PRS measurement is not expected, the gNB 120 may also transmit 210 a signalling to cause the UE 110 release the corresponding MG configurations associated with the one or more MOs or the PRS measurement.

The solution proposed in the present disclosure is quite flexible since each MO (or each reference signal type in MO or PRS measurement) can be index to different MG configurations. Since the common MG configuration can be referred by every MO (e.g., up to 64 MO may be configured by one UE), the RRC message size can be reduced.

In most of the scenarios, the same MG configuration may be applied to the same reference signal type (e.g., multiple MOs with the same SSB configuration should use the same MG configuration. Therefore, by configuring the default MG configurations, the RRC message size to indicate MG configurations for each MO (or reference signal type or PRS measurement) can be further reduced.

FIG. 3 shows a flowchart of an example method 300 of enabling flexible concurrent MG configuration according to some example embodiments of the present disclosure. The method 300 can be implemented at the first device 110 as shown in FIG. 1. For the purpose of discussion, the method 300 will be described with reference to FIG. 1.

At 310, the first device obtains, from a second device, configuration information at least comprising a set of default measurement gap configurations associated with at least one of the following: a reference signal type related to at least one measurement object, or a positioning reference signal measurement.

In some example embodiments, respective weights are configured for the set of default measurement gap configurations.

In some example embodiments, the first device may obtain a common measurement gap configuration list indicating a first set of measurement gap configurations configured for all frequency ranges of the first device, a second set of measurement gap configurations configured for a frequency range and respective indices for the first and the second sets of measurement gap configurations.

In some example embodiments, a set of parameters configured for the first and the second set of measurement gap configurations comprise at least one of respective measurement gap lengths, respective measurement gap repetition periods, respective gap offsets, respective gap pattern identifications, or respective gap types.

In some example embodiments, respective weights are configured for the first and the second set of measurement gap configurations.

In some example embodiments, the set of default measurement gap configurations comprises a subset of the common measurement gap configuration list.

In some example embodiments, the first device may receive the configuration information via a Radio Resource Control signaling.

At 320, the first device receives, from the second device, an indication whether at least one default measurement gap configuration in the set of default measurement gap configurations is allowed to be used for at least one of a target positioning reference signal measurement and one or more target measurement objects.

In some example embodiments, the first device may receive the indication via at least one of a radio resource control signaling, a DCI or a MAC-CE.

In some example embodiments, the first device may receive the indication along with the configuration information via a radio resource control signaling.

At 330, the first device performs, based on the indication, at least one target measurement associated with at least one of the target positioning reference signal measurement and the one or more target measurement objects.

In some example embodiments, if the first device determines, based on the indication, that the at least one default measurement gap configuration is allowed to be used for at least one of the target positioning reference signal measurement and the one or more target measurement objects, the first device may perform the at least one target measurement based on the at least one default measurement gap configuration.

In some example embodiments, the first device may perform the at least one measurement based on respective weights of the at least one default measurement gap configuration.

In some example embodiments, if the first device determines, based on the indication, that the at least one default measurement gap configuration is not allowed to be used, the first device may determine, from a common measurement gap configuration list included in the configuration information, a set of target measurement gap configurations to be activated for the at least one of a target positioning reference signal measurement and one or more target measurement object and perform the at least one target measurement based on the set of target measurement gap configurations.

In some example embodiments, the first device may perform the at least one measurement based on respective weights of the set of target measurement gap configurations.

In some example embodiments, the first device comprises a terminal device and the second device comprises a network device.

FIG. 4 shows a flowchart of an example method 400 of enabling flexible concurrent MG configuration according to some example embodiments of the present disclosure. The method 400 can be implemented at the second device 120 as shown in FIG. 1. For the purpose of discussion, the method 400 will be described with reference to FIG. 1.

At 410, the second device provides, from a first device, configuration information at least comprising a set of default measurement gap configurations associated with at least one of the following: a reference signal type related to at least one measurement object, or a positioning reference signal measurement.

In some example embodiments, respective weights are configured for the set of default measurement gap configurations.

In some example embodiments, the second device may provide a common measurement gap configuration list indicating a first set of measurement gap configurations configured for all frequency ranges of the first device, a second set of measurement gap configurations configured for a frequency range and respective indices for the first and the second sets of measurement gap configurations.

In some example embodiments, a set of parameters configured for the first and the second set of measurement gap configurations comprise at least one of respective measurement gap lengths, respective measurement gap repetition periods, respective gap offsets, respective gap pattern identifications, or respective gap types.

In some example embodiments, respective weights are configured for the first and the second set of measurement gap configurations.

In some example embodiments, the set of default measurement gap configurations comprises a subset of the common measurement gap configuration list.

In some example embodiments, the second device may provide the configuration information via a Radio Resource Control signaling.

At 420, the second device generates an indication whether at least one default measurement gap configuration in the set of default measurement gap configurations is allowed to be used for at least one of a target positioning reference signal measurement and one or more target measurement objects In some example embodiments, if the set of default measurement gap configurations is allowed to be used, the second device may generate the indication based on respective indices of the at least one default measurement gap configuration.

In some example embodiments, if the set of default measurement gap configurations is not allowed to be used, the second device may generate the indication based on respective indices of a set of target measurement gap configurations, from a common measurement gap configuration list, to be activated for the at least one of a target positioning reference signal measurement and one or more target measurement object.

In some example embodiments, the second device may transmit the indication via at least one of a radio resource control signaling, a DCI or a MAC-CE.

In some example embodiments, the second device may transmit the indication via a radio resource control signaling along with the configuration information.

In some example embodiments, the first device comprises a terminal device and the second device comprises a network device.

In some example embodiments, an apparatus capable of performing the method 300 (for example, implemented at the UE 110) may comprise means for performing the respective steps of the method 300. The means may be implemented in any suitable form. For example, the means may be implemented in a circuitry or software module.

In some example embodiments, the apparatus comprises means for obtaining, from a second device, configuration information at least comprising a set of default measurement gap configurations associated with at least one of the following: a reference signal type related to at least one measurement object, or a positioning reference signal measurement; means for receiving, from the second device, an indication whether at least one default measurement gap configuration in the set of default measurement gap configurations is allowed to be used for at least one of a target positioning reference signal measurement and one or more target measurement objects; and means for performing, based on the indication, at least one target measurement associated with at least one of the target positioning reference signal measurement and the one or more target measurement objects.

In some example embodiments, an apparatus capable of performing the method 400 (for example, implemented at the gNB 120) may comprise means for performing the respective steps of the method 400. The means may be implemented in any suitable form. For example, the means may be implemented in a circuitry or software module.

In some example embodiments, the apparatus comprises means for providing, to a first device, configuration information at least comprising a set of default measurement gap configurations associated with at least one of the following: a reference signal type related to at least one measurement object, or a positioning reference signal measurement; means for generating an indication whether at least one default measurement gap configuration in the set of default measurement gap configurations is allowed to be used for at least one of a target positioning reference signal measurement and one or more target measurement objects; and means for transmitting the indication to the first device.

Figure 5:
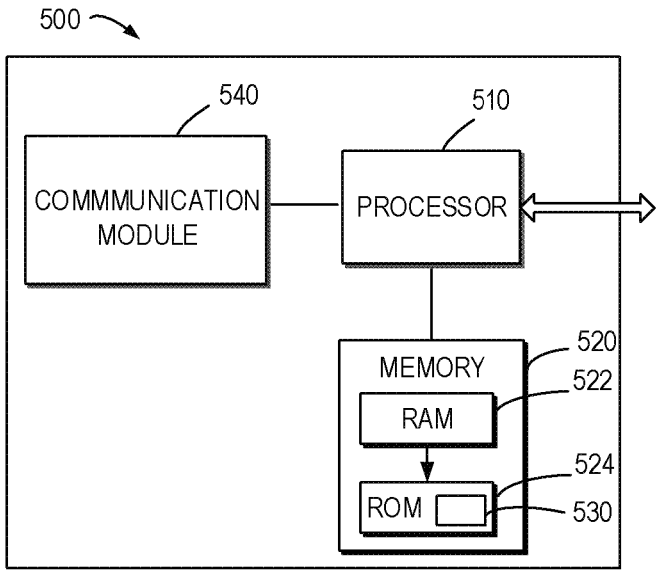
FIG. 5 shows a simplified block diagram of a device that is suitable for implementing example embodiments of the present disclosure.

FIG. 5 is a simplified block diagram of a device 500 that is suitable for implementing embodiments of the present disclosure. The device 500 may be provided to implement the communication device, for example the UE 110 and the gNB 120 as shown in FIG. 1. As shown, the device 500 includes one or more processors 510, one or more memories 540 coupled to the processor 510, and one or more communication modules 540 coupled to the processor 510.

The communication module 540 is for bidirectional communications. The communication module 540 has one or more communication interfaces to facilitate communication with one or more other modules or devices. The communication interfaces may represent any interface that is necessary for communication with other network elements. In some example embodiments, the communication module 540 may include at least one antenna.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 520. The processor 510 may perform any suitable actions and processing by loading the program 530 into the RAM 520.

The embodiments of the present disclosure may be implemented by means of the program 530 so that the device 500 may perform any process of the disclosure as discussed with reference to FIGS. 2 to 4. The embodiments of the present disclosure may also be implemented by hardware or by a combination of software and hardware.

Figure 6:
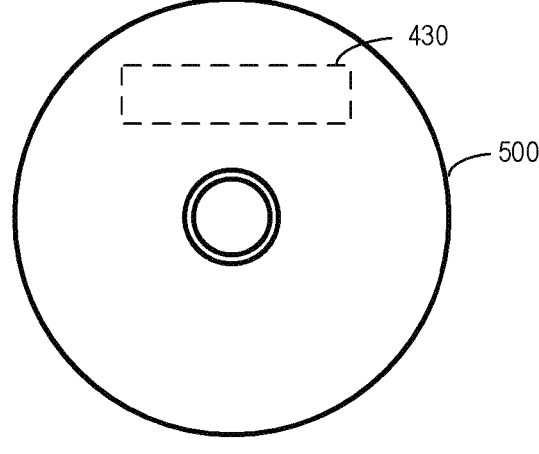
FIG. 6 shows a block diagram of an example computer readable medium in accordance with some embodiments of the present disclosure.

In some embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like. FIG. 6 shows an example of the computer readable medium 600 in form of CD or DVD. The computer readable medium has the program 530 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 400-500 as described above with reference to FIGS. 4-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method comprising:
obtaining, from a second device, configuration information comprising a set of default measurement gap configurations configured for one or more frequency layers and a positioning reference signal (PRS) measurement, the set of default measurement gap configurations being associated with the following:
a reference signal type related to at least one measurement object; and
a positioning reference signal measurement;
receiving, from the second device, an indication that indicates whether the default measurement gap configurations in the set of default measurement gap configurations are allowed to be used for at least one of a target positioning reference signal measurement and one or more target measurement objects based on a weighted value of the default measurement gap configurations;
determining, based on the indication, that the default measurement gap configurations are not allowed to be used; and
based on determining that the default measurement gap configurations are not allowed to be used:
obtaining a common measurement gap configuration list indicating a first set of measurement gap configurations configured for all frequency ranges of a first device to be used by different target frequency layers to be measured when concurrent measurement gap configurations are to be used, a second set of measurement gap configurations configured for a frequency range and respective indices for the first and the second sets of measurement gap configurations, wherein a set of parameters configured for the first and the second set of measurement gap configurations comprise the following: respective measurement gap lengths, respective measurement gap repetition periods, respective measurement gap timing advances, respective gap offsets, respective gap pattern identifications, and respective gap types, wherein each measurement gap configuration in the common measurement gap configuration list is configured with a measurement weight for determining measurement time sharing, and wherein each measurement gap configuration in the first set and the second set of measurement gap configurations is assigned by an index associated to a frequency layer;

determining, from the common measurement gap configuration list included in the configuration information, a set of target measurement gap configurations to be activated for the at least one of a target positioning reference signal measurement and one or more target measurement objects; and performing at least one target measurement based respective weights of the set of target measurement gap configurations.

2. The method of claim 1, wherein respective weights are configured for the set of default measurement gap configurations.

3. The method of claim 2, wherein respective weights are configured for the first and the second set of measurement gap configurations.

4. The method of claim 3, wherein the set of default measurement gap configurations comprises a subset of the common measurement gap configuration list.

5. The method of claim 4, wherein obtaining the configuration information comprises:

receiving the configuration information via a Radio Resource Control signaling.

6. The method of claim 5, wherein receiving the indication comprises:

receiving the indication via a radio resource control signaling, downlink control information, and medium access control-control element.

7. The method of claim 5, wherein receiving the indication comprises:

receiving the indication along with the configuration information via a radio resource control signaling.

8. The method of claim 7, wherein the first device comprises a terminal device and the second device comprises a network device.

9. A system comprising:

a first device;

a processor; and a non-transitory computer-readable medium comprising computer-executable instructions that, when executed by the processor, cause the process to processor to perform the following operations:

obtaining, from a second device, configuration information comprising a set of default measurement gap configurations configured for one or more frequency layers and a positioning reference signal (PRS) measurement, the set of default measurement gap configurations being associated with the following:

a reference signal type related to at least one measurement object; and a positioning reference signal measurement;

receiving, from the second device, an indication that indicates whether the default measurement gap configurations in the set of default measurement gap configurations are allowed to be used for at least one of a target positioning reference signal measurement and one or more target measurement objects based on a weighted value of the default measurement gap configurations;

determining, based on the indication, that the default measurement gap configurations are not allowed to be used; and based on determining that the default measurement gap configurations are not allowed to be used:

obtaining a common measurement gap configuration list indicating a first set of measurement gap configurations configured for all frequency ranges of the first device to be used by different target frequency layers to be measured when concurrent measurement gap configurations are to be used, a second set of measurement gap configurations configured for a frequency range and respective indices for the first and the second sets of measurement gap configurations, wherein a set of parameters configured for the first and the second set of measurement gap configurations comprise the following: respective measurement gap lengths, respective measurement gap repetition periods, respective measurement gap timing advances, respective gap offsets, respective gap pattern identifications, and respective gap types, wherein each measurement gap configuration in the common measurement gap configuration list is configured with a measurement weight for determining measurement time sharing, and wherein each measurement gap configuration in the first set and the second set of measurement gap configurations is assigned by an index associated to a frequency layer;

determining, from the common measurement gap configuration list included in the configuration information, a set of target measurement gap configurations to be activated for the at least one of a target positioning reference signal measurement and one or more target measurement objects; and performing at least one target measurement based respective weights of the set of target measurement gap configurations.

10. The system of claim 9, wherein respective weights are configured for the set of default measurement gap configurations.

11. The system of claim 10, wherein respective weights are configured for the first and the second set of measurement gap configurations.

12. The system of claim 11, wherein the set of default measurement gap configurations comprises a subset of the common measurement gap configuration list.

13. The system of claim 12, wherein obtaining the configuration information comprises: receiving the configuration information via a Radio Resource Control signaling.

14. The system of claim 12, wherein receiving the indication comprises:

receiving the indication via a radio resource control signaling, downlink control information, and medium access control-control element.

15. The system of claim 14, wherein receiving the indication comprises:

receiving the indication along with the configuration information via a radio resource control signaling.

16. An apparatus comprising:

a processor; and a non-transitory computer-readable medium comprising computer-executable instructions that, when executed by the processor, cause the process to processor to perform the following operations:

obtaining, from a second apparatus, configuration information comprising a set of default measurement gap configurations configured for one or more frequency layers and a positioning reference signal (PRS) measurement, the set of default measurement gap configurations being associated with the following:

a reference signal type related to at least one measurement object; and a positioning reference signal measurement;

receiving, from the second apparatus, an indication that indicates whether the default measurement gap configurations in the set of default measurement gap configurations are allowed to be used for at least one of a target positioning reference signal measurement and one or more target measurement objects based on a weighted value of the default measurement gap configurations;

determining, based on the indication, that the default measurement gap configurations are not allowed to be used; and based on determining that the default measurement gap configurations are not allowed to be used:

obtaining a common measurement gap configuration list indicating a first set of measurement gap configurations configured for all frequency ranges of the apparatus to be used by different target frequency layers to be measured when concurrent measurement gap configurations are to be used, a second set of measurement gap configurations configured for a frequency range and respective indices for the first and the second sets of measurement gap configurations, wherein a set of parameters configured for the first and the second set of measurement gap configurations comprise the following: respective measurement gap lengths, respective measurement gap repetition periods, respective measurement gap timing advances, respective gap offsets, respective gap pattern identifications, and respective gap types, wherein each measurement gap configuration in the common measurement gap configuration list is configured with a measurement weight for determining measurement time sharing, and wherein each measurement gap configuration in the first set and the second set of measurement gap configurations is assigned by an index associated to a frequency layer;

determining, from the common measurement gap configuration list included in the configuration information, a set of target measurement gap configurations to be activated for the at least one of a target positioning reference signal measurement and one or more target measurement objects; and performing at least one target measurement based respective weights of the set of target measurement gap configurations.

17. The apparatus of claim 16, wherein respective weights are configured for the set of default measurement gap configurations, and wherein respective weights are configured for the first and the second set of measurement gap configurations.

18. The apparatus of claim 17, wherein the set of default measurement gap configurations comprises a subset of the common measurement gap configuration list.

19. The apparatus of claim 18, wherein receiving the indication comprises:

receiving the indication via a radio resource control signaling, downlink control information, and medium access control-control element.

20. The apparatus of claim 18, wherein receiving the indication comprises:

receiving the indication along with the configuration information via a radio resource control signaling.

* * * * *